Figure 1:

United States Patent [19]

Simonet et al.

[11] Patent Number: 5,200,041
[45] Date of Patent: Apr. 6, 1993

[54] COMPOSITE ELEMENT INCORPORATING A POLYETHER OR COPOLYETHER, ITS PREPARATION PROCESS AND ITS USE FOR EXTRACTING AND SEPARATING METAL CATIONS

[75] Inventors: Jacques Simonet, Betton; Angely Lysiane, Cesson Sevigne; Noëlle Simonet, Betton; Viviane Questaigne, Rennes; Veronique Le Berre, Languijie; Henri Bouas-Laurent, Talence; Jean-Pierre Desvergne, Leognan, all of France

[73] Assignees: Centre National De La Recherche Scientifique; Commissariat A L'Energie Atomique, Paris, France

[21] Appl. No.: 613,532

[22] PCT Filed: Mar. 15, 1990

[86] PCT No.: PCT/FR90/00174

§ 371 Date: Jan. 9, 1991

§ 102(e) Date: Jan. 9, 1991

[87] PCT Pub. No.: WO90/11390

PCT Pub. Date: Oct. 4, 1990

[30] Foreign Application Priority Data

Mar. 17, 1989 [FR] France .................. 89 03529

[51] Int. Cl.⁵ .......................................... B32B 7/00
[52] U.S. Cl. ........................... 204/78; 205/317; 210/502.1; 210/687; 210/688; 210/506; 210/507; 210/508
[58] Field of Search .............. 204/78, 182.4; 549/347, 549/351; 205/317; 210/502.1, 688, 687, 506, 507, 508

[56] References Cited

U.S. PATENT DOCUMENTS 4,584,075 4/1986 Goldstein et al. .............. 204/182.3
4,738,757 4/1988 Naarmann ....................... 204/78

FOREIGN PATENT DOCUMENTS 61-11336 5/1986 Japan .

OTHER PUBLICATIONS

Electroactive Charge-Transfer Polymers from Anodic Coupling of Dibenzo-Crown Ether; Le Berre et al. (1986) pp. 115-130.
Chemcial Abstracts, vol. 108, 1988, (Columbus, Ohio, US), V. Le Berre et al.: "Electrocative Charge Transfer Polymers from Anodic Coupling of Dibenzo-Crown Ethers. Part III. Intrinsic Redox Properties and Preliminary use as electrode Modifiers", p. 558, resume 102876f, & J. Electroanal. Chem. Interfacial Electrochem. 1988, 240 (1 2), 117–32.
Chem. Abst., vol. 108, 1988, p. 558 10286f, Le Berre et al.: "Electroactive Charge Transfer Polymers ... use as Electrode Modifiers".
Chem. Abst., vol. 108, 1988, p. 75, 131770g, Le Berre et al.: "Anodic Trimerization. A Facile One-Step Synthesis of Tris(15-Crown)Triphenylene" & J. Chem. Soc., Chem. Comun. 1987, (13), 984–6.

Primary Examiner—John Niebling
Assistant Examiner—Arun S. Phasge
Attorney, Agent, or Firm—Oblon, Spivak, McClelland, Maier & Neustadt

[57] ABSTRACT

The invention relates to a composite element incorporating a support of an organic, electricity conducting, polyaromatic structure product, such as graphite, covered with a polymer or copolymer of dibenzoethers of formula:

and/or

-continued
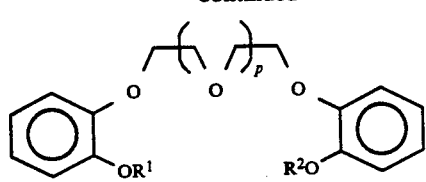
(II)
in which m=0 or 1 to 10, n=0 or 1 to 10, m+n≦10, p=0 or 1 to 6, $R^1$=alkyl or aryl, $R^2$=alkyl or aryl.
These elements are usable for absorbing metal cations present in an aqueous or organic solution.
15 Claims, 1 Drawing Sheet

COMPOSITE ELEMENT INCORPORATING A POLYETHER OR COPOLYETHER, ITS PREPARATION PROCESS AND ITS USE FOR EXTRACTING AND SEPARATING METAL CATIONS

The present invention relates to a composite element incorporating a polyether or copolyether more particularly usable for extracting and/or separating cations.

Over the last few years new materials have been developed having macrocyclic ligands, such as cryptates and crown ethers, which are supported or incorporated into polymers. Such materials can be used in widely differing fields, due to the complexing properties of the macrocyclic ligands and they can consequently be used for such varied purposes as catalysis by two or three-phase transfer and the preparation of ion selective or ion exchange membranes used for producing specific electrodes or ion selective field effect transistors.

When these macrocyclic ligand functions are included in polymers, the properties of the ligand are generally identical, but can nevertheless in certain cases have modifications induced by the constraint of the polymeric material.

However, the incorporating of ligands into a polymeric material by polymerization of the monomer, itself incorporating the ligand function, offers numerous advantages. Thus, unlike in the case of molecular ligands, incorporated ligands are not toxic and also have the practical advantages of supported reagents. Moreover, the material naturally has a very high number of ligands. As they are incorporated into the polymer chain, they are insoluble and consequently there are only minimum risks of the contamination of solutions. They can be very easily separated therefrom, can be regenerated and then reused without any activity loss. This advantage is far from being negligible when considering the relatively high cost and difficulty of preparing most macrocyclic ligands. Furthermore, this incorporation method makes it possible to use these ligands in widely varying form, e.g. in the form of membranes, without any particular production problems.

Among the macrocyclic ligands, a great deal of research has been carried out on crown ethers and it has recently been discovered that it was possible to polymerize crown ethers electrochemically and as described by V. de Barre in J. Electroanal. Chem., 206, 115, 1986, J. Electroanal. Chem., 240, 117, 1988 and Nouveau Journal de Chimie, vol. 9, No. 6-1985, pp 419 to 426.

Thus, the polymers obtained by this method are interesting, but are likely to have steric limitations according to the nature of the ions to be complexed. Moreover, their adhesion to the platinum supports used as the anode during their preparation is not satisfactory. In the same way the access of the reagents in the polymer layer does not take place sufficiently easily for certain applications. The present invention specifically relates to novel composite elements incorporating a support covered by a relatively thick polymer layer obviating the disadvantages of the composite elements described hereinbefore.

According to a first embodiment of the invention, the composite element comprises a support of a product having a polyaromatic electricity conducting structure covered by a polymer or copolymer of a monomeric crown dibenzoether of formula:

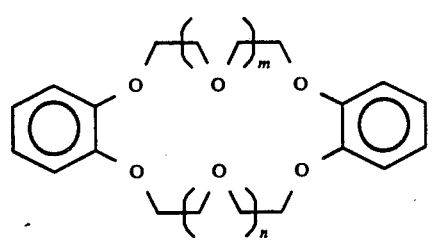

in which m and n, which can be the same or different, can assume values 0 and 1 to 10, provided that $m+n \leq 10$.

In this composite element, the use of a support having a polyaromatic structure makes it possible to obtain an improved adhesion between the crown dibenzoether polymer or copolymer and the support. Moreover, with such supports, there is an increase in the performance characteristics of the electrodeposited polymer, because the latter has a much larger specific surface than with metallic supports, which permits an easier access of the reagents in the active sites of the composite element.

Finally, said supports are advantageous because they are generally much else onerous than supports made from platinum or non-corrodable precious metals such as are used at present.

According to a second embodiment of the invention, the composite element comprises a support made from metal or a product with an electricity conducting, polyaromatic structure, which is covered by a polymer or copolymer of a monomeric "crescent" dibenzoether of formula:

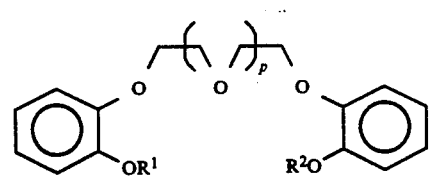

in which p is equal to 0 or is an integer between 1 and 6 and $R^1$ and $R^2$, which can be the same or different, are alkyl, aryl or heterocyclic radicals.

The use of a polymer formed from a "crescent" dibenzoether (II) makes it possible to modify or avoid the geometrical limitations which may occur during the complexing of metal ions, as is the case for polymers having a cyclic cavity in accordance with formula (I).

In the case of dibenzoethers of formula (II), only the presence in the ortho position of $OR^1$ and $OR^2$ radicals, conditions the obtaining by polymerization of a well organized structure having the stack of patterns. Thus, the complexing of cations could then take place by bringing about the intervention of all the heteroatoms of the open chain ligand with an increased effect.

In these composite elements incorporating a polymeric layer of compound (II), the support can either be of non-corrodable metal, or of an electricity conducting, organic or inorganic polyaromatic structure product.

In this second embodiment, the use of monomers of type (II) makes it possible to use metal supports, because there is no adhesion problem as occurs with monomers of type (I).

The metals or metallized anodic supports used are non-oxidizable metals with a potential of +1V compared with a 0.1M Ag/Ag+ electrode. Examples of such metals are gold, platinum, rhodium and all precious metals.

As in the case of polymers formed from crown ethers of formula (I), it is more interesting (cost, larger specific surface area, better adhesion of the resin to the support) to use a support having an electrically conducting, polyaromatic structure.

These polyaromatic structure support materials can be of the inorganic type, such as graphites, or of the organic type, such as conductive polymers, e.g. polyanilines, polythiophenes and polypyrroles. Vitrified carbon, which does not have this polyaromatic structure, is not suitable in the present invention. The supports used can have a specific surface of 0.01 to 20 $m^2/g$.

The supports used in the invention can be continuous, e.g. can be in the form of plates, grids, fibres, felts or fabrics. In particular graphite fibres, felts and fabrics are used. However, according to the invention, it is also possible to use a discontinuous support formed from particles, e.g. graphite powder or balls. For certain applications, the use of a discontinuous support in dispersed form is of interest, because it makes it possible to obtain an element having a larger specific surface. With a particle discontinuous support, there is also a greater ease of percolation of the solutions into the composite element, which is particularly interesting for certain uses.

However, the continuous supports according to the invention may only have a specific surface of approximately 1 $m^2/g$ or less, whilst still permitting the deposition of a polymer with a satisfactory quality.

The supports used in the invention can also have a composite structure, e.g. can be formed by naturally oxidizable metals covered with a continuous layer of a non-oxidizable metal, or a continuous layer of an electricity conducting, polyaromatic structure product. This is also applicable to both continuous and discontinuous supports.

In the composite element according to the invention the dibenzoether copolymers of formulas (I) and (II) can be of different types. Thus, they can be copolymers of dibenzoethers of formulas (I) and (II) with other identical monomers. It is also possible to use copolymers of a dibenzoether of formula (I) and a dibenzoether of formula (II).

The composite elements according to the invention are prepared by polymerizing by electrochemical oxidation, the mixtures of corresponding monomers of formulas (I) and/or (II) on an anode incorporating a metal support or an electricity conducting, polyaromatic structure product.

In the case of monomers of formula (I), m and n can assume the value 0 or values between 1 and 10, but m+n must not exceed 10.

As examples of usable crown dibenzoethers, reference can be made to those for which m=n=0, m=n=1, m=0, n=1, m=n=2.

In the case of the monomers of formula (II), the radicals $R^1$ and $R^2$, which can be the same or different, are alkyl or aryl radicals. The alkyl radicals used can be straight or branched and preferably have 1 to 4 carbon atoms. For example $R^1$ and $R^2$ can represent the methyl radical.

The aryl and heterocyclic radicals which can be used are radicals having a good electrochemical stability, because they must have no reactivity during polymerization. Examples of usable radicals are phenyl, 2 and 3-thiophene and 2 and 3-pyrrole radicals.

In the dibenzoethers of formula (II), p can be equal to 0 or can assume values between 1 and 4.

As an example of dibenzoether of formula (II), reference can be made to those with $R^1=R^2=CH_3$ and p=0 or 2.

The dibenzoethers of formula (I) or (II) used as the starting product for said polymerization can be prepared by conventional processes or are commercially available.

In the case of crown dibenzoethers of formula (I), it is possible to use the Williamson synthesis, as described by V. Le Berre et al in Nouveau Journal de Chemie, vol. 9, No. 6, 1985, p 420. In the case of dibenzoethers of formula (II), it is possible to use the following operating procedure:

The starting product is constituted by phenol or phenols of formula:

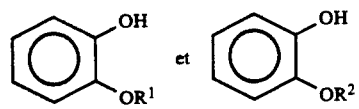

in which $R^1$ and $R^2$ have the meanings given hereinbefore and which are reacted with sodium hydride ad then with a ditosylate of formula

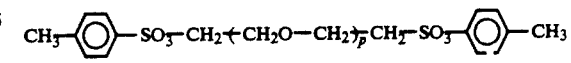

in which p has the meaning given hereinbefore.

When starting with two different phenols, the different products obtained are then separated by conventional methods in order to isolate the sought product of formula:

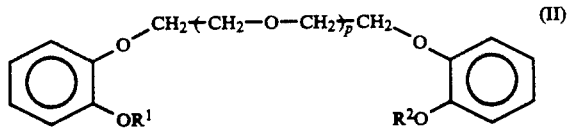

For the polymerization of monomers (I) or (II), use is made of an electrolytic cell in which the anode forms the support for the composite element. The cathode can be made from various electricity conducting materials, e.g. vitreous carbon or platinum. The monomer of formula (I) and/or formula (II) are introduced into the electrolytic cell dissolved in an appropriate solvent incorporating a support electrolyte. The solvents used are organic solvents, which must be substantially free from water, because electropolymerization has to be carried out in a medium avoiding the nucleophilic character of the water. The solvents must also not be oxidized at the voltage used for dibenzoether electropolymerization.

Examples of organic solvents which can be used are acetonitrile, methylene chloride and aprotic solvents such as nitromethane, nitrobenzene, propionitrile and 1,3-dioxolan. It is also possible to use mixtures of these solvents. The solvent is generally constituted by a mixture of methylene chloride and acetonitrile.

It is also possible to use pure acetonitrile, but this leads to a compact deposit, which is less thick and less conductive.

The support electrolytes are salts, in particular quaternary ammonium or alkali metal salts. The anion of the salt must be less oxidizable than the dibenzoether of formula (I) or (II).

Examples of salts which can be sued are tetraalkyl ammonium, hexafluoroarsenates, hexafluorophosphates, perchlorates and tetrafluoborates, e.g. tetramethyl, tetraethyl, tetrapropyl, tetrabutyl or tetrapentyl ammonium.

As in the case of the solvent, it is vital that the electrolyte is also free from water. The electrolyte and the solvent are subject to conventional purification and drying methods. Thus, when using acetonitrile, the latter is stored on an activated molecular screen or sieve and is distilled on phosphoric anhydride just prior to use. In the case of methylene chloride, the latter is stored under the same conditions, but is distilled on calcium hydride.

In order to carry out polymerization, to the anode is applied a potential higher than 1V compared with a 0.1M Ag/Ag+ reference electrode in order to oxidize the dibenzoether according to the following reaction: M→M'+4H, with M representing the starting monomer and M' the oxidized monomer. Thus, 4 protons per monomer are stoichiometrically extracted.

the material formed is in accordance with formula:

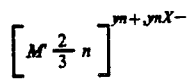

$$\left[ M\frac{2}{3}n \right]^{yn+,ynX-}$$

in which n represents the degree of polymerization, e.g. 50 to 100, y represents the oxidation or doping level, generally 0.5 for the most stable form and $X^-$ is the anion of the electrolyte.

Thus, anions from the electrolyte are included in the polymer during said oxidation and in said polymer is obtained a doping level of 0.5 anion per monomer. The very stable oxidized polymeric structure formed is probably constituted by stacked planar systems, the $X^-$ anions being distributed in order to balance the positive charges resulting from the oxidation, so that one doping anion is used for two polymer layers.

In the case of dibenzoethers of formula (I), polymerization takes place in the manner described by V. Le Berre et al in the aforementioned articles, by trimerizing coupling of aromatic triphenylene nuclei, as demonstrated with veratrole. This gives a stack of sheets, each having the following basic structure (for m=n=1, with Y=1):

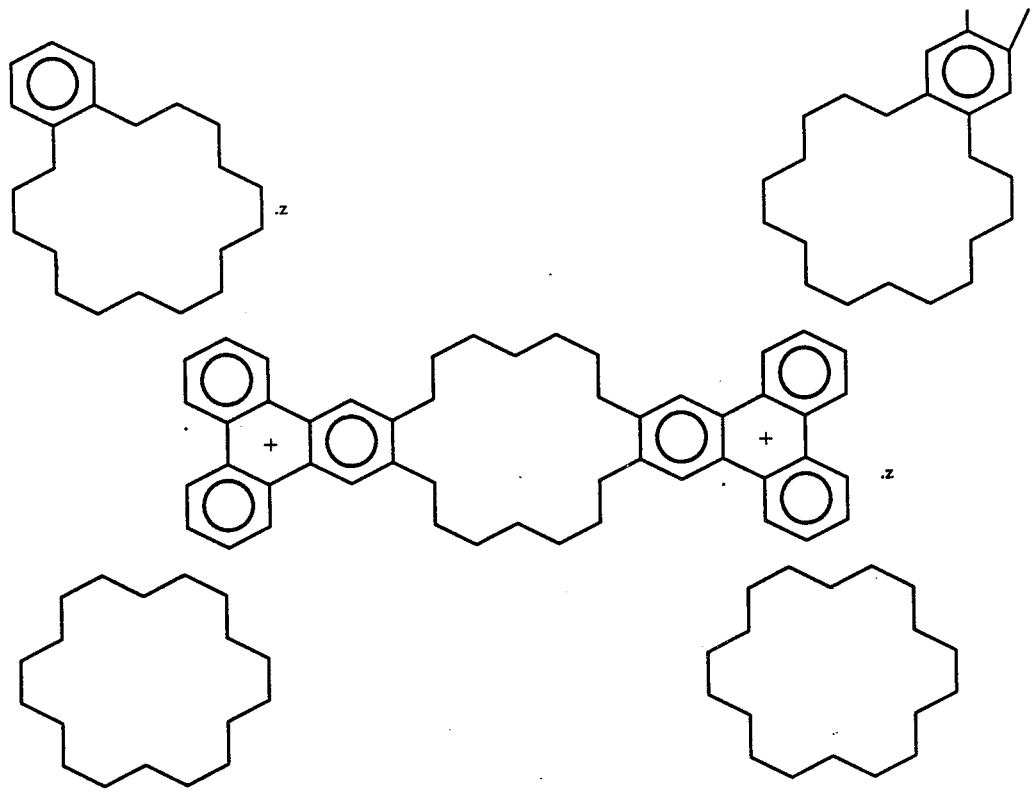

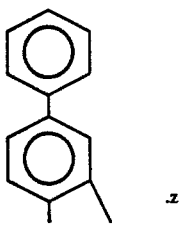

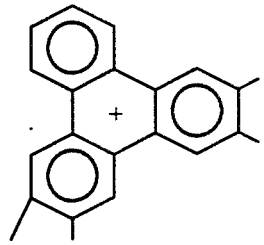

The regular stack of polymer planes forms ionopheric channels at the locations corresponding to the crowns of the basic dibenzoethers.

In the case of dibenzoethers of formula (II), polymerization takes place according to an identical mechanism and once again a stack of sheets with the following basic structure is obtained (for p=0, $R^1=R^2=CH_3$ and y=1), where the crowns are replaced by "crescents", whose superimposing also determines ionopheric channels:

carried out in the presence of activated neutral alumina as a drying agent added to the solution.

Following the deposition of the polymer by electrolysis, the composite element obtained is carefully rinsed in a pure organic solvent such as acetonitrile in order to eliminate the monomers which have not reacted and also the soluble oligomers, after which it is dried in vacuum.

When it is wished to produce a composite element in which the support is discontinuous and e.g. constituted

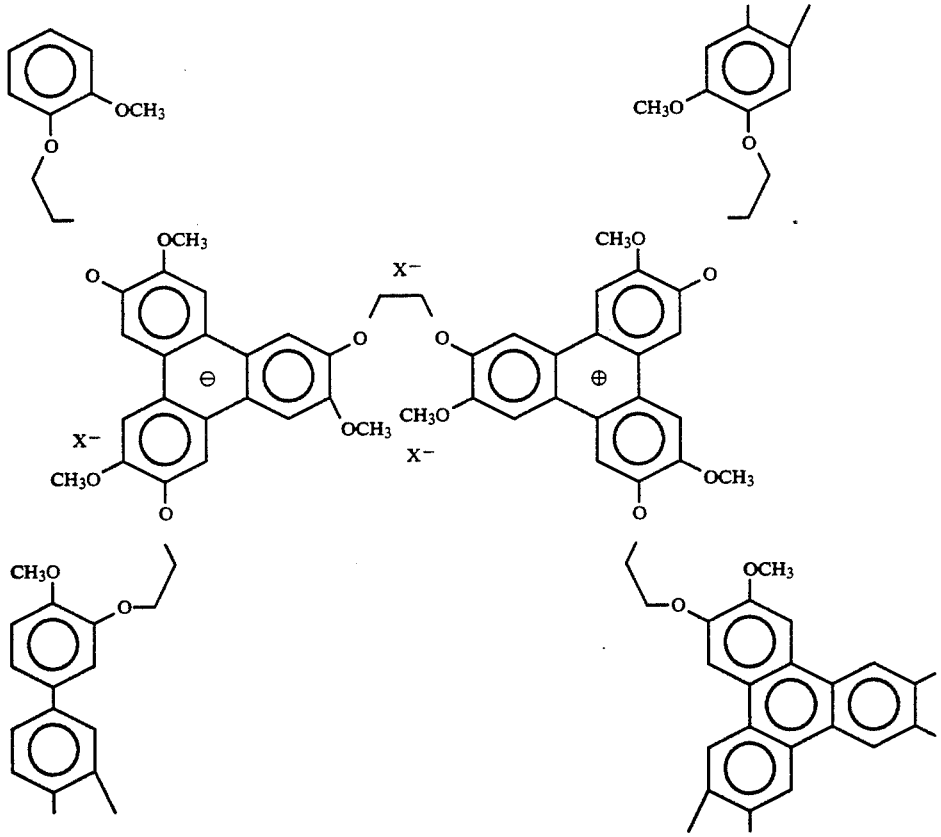

Electropolymerization can be carried out under potentiostatic or intensiostatic conditions. In this case, a relatively low current density is used in order to obtain a fine deposit with a large specific surface area. Generally the current density is below 10 mA/cm². Preferably polymerization takes place under potentiostatic conditions.

Polymerization must be carried out in an inert atmosphere, e.g. by scavenging or sweeping the electrolysis cell with dry argon, which is completely free from oxygen and water vapour. Polymerization can also be by graphite particles, the polymer is also deposited on the particles by electrochemical oxidation of the monomers dissolved in an appropriate organic solvent incorporating an electrolyte. In this case, it is possible to use the same solvents and electrolytes as previously and to disperse the graphite particles in the solution using an anode made from an electricity conducting material, which is not oxidizable or corrodable in said solution, e.g. a vitrified carbon anode and by stirring the solution so that there are repeated contacts between the graphite particles and the anode and a polymer deposit is formed on the graphite particles by electropolymerization, a membrane being interposed in order to prevent contacts between the particles and the cathode. The use of a carbon anode is advantageous in this case, because it has been found that it was impossible to deposit by electropolymerization the dibenzoethers used in the invention on carbon electrodes not containing delocalized electrons.

In all case, the electropolymerization of the dibenzoether on the discontinuous or continuous supports according to the invention is carried out in such a way as to deposit a thin polyether film.

Although this procedure makes it possible to form thick layers or films, it is generally preferable to limit their thickness to values of 10 to 20 $\mu$m, especially when the composite element obtained is intended for the extraction and separation of metal cations from solutions. Thus, with such thicknesses, there is a maximum utilization of the absorption capacity of the polymer without using excessive diffusion times.

The composite element with a continuous or discontinuous support obtained by the above process has numerous uses, which are specific to the properties of the macrocyclic ligand contained therein. Preferably, according to the invention, said element is used for extracting and/or separating cations present in solutions.

For this use, it is necessary to subject the composite element obtained by electrochemical polymerization to a complimentary treatment in order to at least partly dedope it. For this purpose it is necessary to reduce it and thus to relatively completely eliminate the anions obtained from the electrolyte, used as counterions, which are included between the sheets of the polymer structure. This reduction can be performed either electrochemically or chemically. Electrochemical reduction is facilitated by the presence of the conductive support, which makes it possible to operate directly in the electrolysis cell used for the polymerization by changing the polarity of the electrode on which the composite element according to the invention has been previously formed.

For example, it is possible to apply to said electrode a potential of $-1$ V compared with the 0.1M Ag/Ag$^+$ electrode. In this case, dedoping is ended when no further current passes into the cell. In general, the treatment is interrupted before this stage, e.g. when the polymer doping level y has passed to less than 0.3, e.g. 0.25 or 0.15.

Said treatment can also be carried out chemically by subjecting the composite element to the action of a gentle reducing agent such as the superoxide ion (e.g. t-butyl-ammonium superoxide, which is directly electrogenerated in the cell by reduction of the oxygen into aprotic solvent).

It is obviously also possible to use other reducing agents, but it must be ensured that they do not react with the polymer layer. Thus, inorganic reducing agents must be excluded, because there could be a concomitant inclusion of metal cations in the polymer layer. Certain organic reducing agents must also be excluded, because by reactions within the polymer layer they can lead to sometimes irreversible structural modifications.

The dedoping treatment can be followed by a color change of the polymer layer. Thus, the doped polymer layer is generally blue-black and becomes light or bright, having a low conductivity when it is dedoped. Thus, when it is dedoped at y=0.2 it is slightly brown and becomes pale yellow to transparent when it is completely dedoped (y<0.01). Its conductivity then passes from 1 to less than $10^{-6}$ S/cm.

The composite element obtained by the process according to the invention has both in the doped and dedoped state a very good chemical and thermal stability, doubtless due to the sheet structure of the polymer.

Thus, the composite element is very stable in air and resists the action of solvents, acids and bases, even when hot. Thus, after immersion for three weeks in boiling 0.5N sulphuric acid, it is not modified. It also resists temperatures up to 350° C.

Only the composite element of the invention in partly dedoped form can be effectively used for extracting or separating cations from solutions which may be highly corrosive.

In addition, the invention also relates to a process for the extraction and/or separation of cations present in a solution consisting of a) contacting said solution with an at least partly dedoped composite element according to the invention for absorbing the cation or cations and b) desorbing the cations absorbed by said element.

In order to carry out this process, a choice is made of a composite element in which the deposited polymer has complexing properties with respect to the cations to be extracted, with cavities adapted to the size of the cations to be trapped.

Thus, the penetration kinetics of the cations is dependent on the size of the cavity and the size of the cation. Moreover, the complexing capacity of the polymer layer also depends on the dimensions of the cage. Thus, when the layer is formed from a crown ether polymer of formula (I) in which n and m are equal to 6, the element has a low affinity for alkali metals, which are too small compared with the dimensions of the cage and are therefore only slightly complexed and are not trapped.

However, the extraction and separation capacity of the composite element is also dependent on other factors such as the pH of the solution containing the cations and the nature of the anion associated with the cation to be extracted.

The maximum absorption capacity of the composite element corresponds experimentally to the stoichiometry of one cation for two crowns or two crescents of the polymer. For example, for a polymer of type (I) with m=n=1, said capacity is at the most 7 to $8.10^{22}$ ions g/100 g of polymer.

This absorption capacity can be modified by the solvent. Preferably working takes place at pH values between 3 and 10. However, for pH values of 1 to 3, it is possible to obtain the extraction, but the kinetics are highly dependent on the ion radius and nature.

Thus, this material is suitable both for extractions in an acid medium and in a basic medium, which represents an advantage compared with certain ion exchange resins, where it is impossible to operate in such a wide pH range which e.g. extends from 3 to 10.

Good results are also obtained when the solutions are highly diluted, because this does not reduce the absorption efficiency.

Moreover, it is possible to carry out said absorption from aqueous solutions or in the presence of organic solvents containing cations.

Thus, the composite element according to the invention can be used for trapping the ions present in very small concentrations, e.g. below $10^{-10}$ mol/l, which is particularly interesting for the treatment of effluents and waste water.

The specific extraction capacity t of the polymer for each cation can be defined as follows:

$$(t) = \frac{\text{mass of the extracted metal cation}}{\text{total mass of the dry polymer after extraction}} \times 100$$

It is dependent on a certain number of experimental factors such as the nature of the solvent, the nature of the associated anion, the active surface of the polymer related to the mass, the coefficient of partition between the solution and the material, the diffusion of the cations into the polymer, etc. thus, it has experimentally been observed that the capacity (t) can reach, after a certain polymer immersion time, the following maximum value:

$$t = \frac{1}{2} \times \frac{C}{(M-4)+C+A} \times 100$$

with C representing the atomic mass of the cation extracted (in g), A the ionic mass of the dopant or associated anion (in g) and M the molar mass of the basic dibenzoether monomer (in g).

The values of the maximum specific extraction capacities are very important. For example, for the polymer of type (I) with $m=n=1$, the following values are obtained:

potassium: approx. 4%
cesium: 12%
silver: 13%
mercury: 20%
gold: at least 20%.

The highest specific extraction capacities are observed with undoped polymers and it has been found that they were higher with thin deposits on graphite fabrics or felts than with thin deposits on a platinum support.

The experimentally found extraction capacities perfectly prove a "stack" structure with, for each metal cation, a complex form of type 2/1 (one metal cation being associated with two polymer crowns or crescents in the stack).

In order to carry out the absorption operation, it is possible to use a column within which is located the composite element according to the invention, e.g. in the form of felt, particles, etc. and to circulate there the solution containing the cations to be extracted.

Following this operation, it is possible to carry out the desorption of the absorbed cations either electrochemically or chemically. In the case of electrochemical desorption, the polymer of the composite element is reoxidized by connecting the element to an electrode e.g. raised to a potential of +1V compared with a 0.1 M Ag/Ag+ electrode in a solvent such as acetonitrile containing an electrolyte. This makes it possible to eliminate the cations included in the polymer, but simultaneous doping takes place of the polymer by the anions of the electrolyte. In addition, for then reusing the element for absorbing cations, following the desorption a further at least partial dedoping of the polymer takes place, as hereinbefore. The desorption operation can be carried out in a device, like that described in FR-A-2 314 209.

It is also possible to carry out desorption by eluting at a pH of substantially 1 using an acid solution, because the mobile protons with high concentration have more affinity for the polymer than the metal cations. Following said chemical desorption, it is possible to use the composite element for a new absorption without complimentary dedoping treatment, because the H+ concentration of the material remains low and does not disturb the absorption of the cations.

The composite elements according to the invention can have uses other than those described hereinbefore with respect to the extraction and/or separation of cations.

Thus, it is possible to use these composite elements as catalyst supports. Following a complimentary treatment of incorporating and reducing a metal with a catalytic activity, such as platinum, nickel, palladium or gold, it is possible to form catalysts from the metal element then in the atomic state. In this case, it is possible to envisage the use of the polymer separated from its support.

These elements can also be used as a selective membrane or as an electrode modifier, particularly in highly polar organic solvents.

Figure 2:
Figure 3:
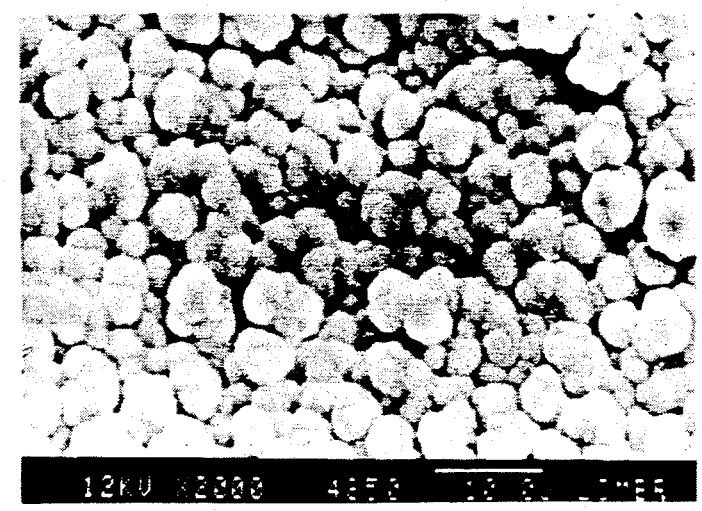

Other features and advantages of the invention can be better gathered from the following examples given in an illustrative and non-limitative manner with reference to the attached drawings, in which FIGS. 1 to 3 are micrographs illustrating the morphology of polymeric deposits obtained according to the invention.

EXAMPLE 1

This example illustrates the preparation of a composite element having a graphite felt support and a polymer layer of crown dibenzoether of formula:

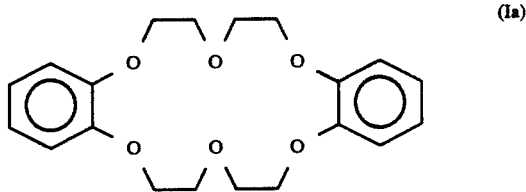

In this example, use is made of a U-shaped electrolytic cell with a volume of 150 ml, whose two compartments are separated by a fritted glass of porosity 3. The cell is located in a glove box, under a dry nitrogen or argon atmosphere and which is free from oxygen.

The anode of the cell is constituted by a graphite felt of mass 300 mg, a specific surface of 0.15 m²/g, a thickness of 2 mm and a total surface area of 450 cm². The anode is placed in an anode compartment and a counter-electrode constituted by a vitreous carbon bar or platinum sheet with a surface area of 20 to 30 cm² is placed in the cathode compartment.

The electrodes are connected to a potentiostat and the oxidation potential is fixed relative to a reference electrode constituted by a silver wire immersed in a 0.1 M Ag NO₃ solution in acetonitrile.

The liquid medium in the cell is formed by a solvent constituted by a 50/50 volume mixture of methylene chloride and acetonitrile, which have been purified and then distilled respectively on CaH₂ and O₂O₅. This solvent comprises 0.2 mole/l of electrolyte constituted by tetra-n-butyl ammonium tetrafluoborate recrystallized three times in an equal volume mixture of water and methanol, followed by careful drying in a vacuum furnace at 120° C. Into said mixture is introduced $10^{-2}$/mole/l of the monomer of formula (Ia) and an oxidation potential of +1.050 V is applied to the anode.

Whilst the current decreases relatively rapidly from 100 to 12 mA, a bright blue-black film forms uniformly on the immersed graphite felt.

After passing 135 columns into the electrolysis circuit, the anode is washed in pure acetonitrile. The polymeric deposit deposited on the graphite felt represents 78 mg.

The attached FIG. 1 is a micrograph illustrating the morphology of said polymeric deposit, which is of the spheroidal type and thus has a high specific surface area.

EXAMPLE 2

This example uses the same operating procedure as in example 1, but using an anode formed by a graphite fabric with a specific surface area of 0.01 m$^2$/g with a surface of 10 cm$^2$ and weighing 450 mg. After passing 91 coulombs into the electrolysis cell, a fabric covered with 52.2 mg of polymer is obtained.

FIG. 2 is a micrograph illustrating the morphology of the deposit obtained. This is characterized by the presence of non-homogeneous deposits having spheroids pressing on certain points (probably activated) of the graphite fibres.

EXAMPLE 3

This example uses the same operating procedure as in example 1 with a platinum anode having a surface of 15 cm$^2$ and a monomer constituted by bis-(orthomethoxyphenoxy)-1,2-ethane of formula:

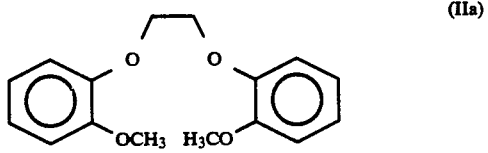

(IIa)

with a concentration of $10^{-2}$ mole/l.

The monomer II is prepared with p=0 and R$^1$=R$^2$=Me in the following way. 9.9 g of guaiacol dissolved in 150 ml of dry toluene are added to a sodium hydride suspension (approx. 3 g) in 150 ml of toluene.

Refluxing thereof takes place for approximately 1 hour and then after returning to ambient temperature there is a dropwise addition of a 14.8 g ethylene glycol ditosylate solution in 300 mol of dry toluene. After refluxing for 30 hours, the solution is filtered hot and approximately 8 g of a white solid is isolated, which complies with formula (IIa):m.p. 136°–137° C., yield 70%:

1H NMR in CDCL$_3$:δppm: 7.0 (s, 8H arom.), 4.35 (s.4H).38(s.6H).

For polymerization, use is made of the same solvent, electrolyte and electrolysis potential as in example 1.

After passing 26 coulombs into the cell, 15 mg of polymer are deposited.

FIG. 3 is a micrograph illustrating the morphology of the deposit obtained. The latter is also formed by spheroids, but these are contiguous.

EXAMPLE 4

The same procedure as in example 3 is used for depositing a polymer layer of bis-(orthomethoxyphenoxy)-1,2-ethane of formula (IIa) on an anode constituted by a graphite fabric with a mass of 460 mg. Following the passage of 48 coulombs, a deposit weighing 28 mg is obtained, whose morphology corresponds to spheroids, as in the case of the deposit of example 2.

COMPARATIVE EXAMPLE 1

This example uses the same operating procedure as in example 1, but with the anode constituted by a carbon felt with a high specific surface (45 m$^2$/g) and not containing graphite. Under these conditions there is no deposit on the surface of the electrode and only dissolved soluble oligomers are formed.

COMPARATIVE EXAMPLE 2

The same operating procedure as in example 3 is followed, but using as the anode a carbon fabric in place of the platinum layer. Under these conditions, there is no deposit on the surface of the electrode and only dissolved soluble oligomers are formed.

EXAMPLE 5

This example uses a discontinuous support formed from fine graphite particles (average diameter 0.1 mm) onto which is polymerized the monomer of formula (Ia) used in example 1.

In this case, use is made of an anode formed by a vitreous carbon plate with a surface of 15 cm$^2$. In the monomer solution of the anode compartment are dispersed 2.5 g of graphite particles and the solution of the anode compartment is vigorously stirred, so that there are numerous contact between the graphite particles and the vitreous carbon plate.

Electropolymerization takes place under the same conditions as in example 1. After passing 13 coulombs into the cell, 48 mg of polymer deposit on graphite particles is obtained. This polymer deposit is constituted by spheroids unevenly distributed over the graphite powder surface.

EXAMPLE 6

This example uses the same operating procedure and the same monomer as in example 1 with a graphite felt anode with an apparent surface area of 10 cm$^2$ and a vitreous carbon counterelectrode (cathode) with a surface of 10 cm$^2$. Polymerization takes place under intensiostatic conditions with a current of 25 mA. After 30 min. electrolysis is stopped and it is found that the graphite felt is covered with 40 mg of polymer and that the deposit is also constituted by contiguous spheroids surround the fibres of the felt.

EXAMPLE 7

This example illustrates the use of composite elements obtained by the process according to the invention for extracting the Ag$^+$ ion.

This example uses a composite element obtained by following the same operating procedure as in example 1 for electropolymerizing the crown dibenzoether of formula (Ia) on a 5 g graphite felt and then subjecting the deposited polymer to a partial dedoping by inversion of the current in the cell and raising the potential of the anode to −2.3V.

This graphite felt covered with 290 mg of partly dedoped polymer (y=0.2) is then used for extracting Ag$^+$ from an aqueous solution containing $1.01.10^{-4}$mole/l of silver nitrate AgNO$_3$.

The felt is placed in a column and 200 ml of silver nitrate solution is passed into said column at a rate of 5 ml/min. After total filtration, the silver content of the solution is determined. It is $0.78.10^{-6}$ mole/l, which corresponds to an extraction of more than 99% $Ag^+$, the specific extraction capacity of the composite element having only reached 0.7% (for tmax=13%).

EXAMPLE 8

This example uses the same operating element as in example 7 for extracting cesium. In this case, the graphite felt mass is 4 g and the dedoped deposited polymer mass 270 mg.

Onto the felt-filled column is passed 250 ml of an aqueous solution containing $1.51.10^{-4}$ mole/l of cesium nitrate. After filtering, the cesium nitrate content of the solution obtained is $5.6.10^{-6}$ mole/l, which corresponds to an extraction of more than 95%, the specific capacity used t being 1.16% for a maximum value of 12%.

EXAMPLE 9 99% A

This example follows the same operating procedure as in example 3 for the electropolymerization on a platinum anode of bis-(orthomethoxyphenoxy)-1,8-dioxa-3,6-octane of formula:

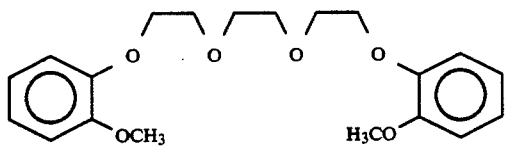
(IIb)

This dibenzoether is prepared in the same way as that necessary for the formation of monomer (IIa).

After electropolymerization under the same conditions as in example 3, the polymer is deposited on the platinum electrode and there is a doping level y=0.34 of $BF_4-$ ions.

The material then undergoes dedoping by reversing the polarity in the cell until the current has disappeared for the dedoped polymer (y<0.1).

This composite material comprising 0.6 g of dedoped polymer is then contacted with an aqueous solution containing 1 mole/l of silver nitrate $AgNO_3$ and 1 mole/l of $Ni(NO_3)_2$. After 24 h contact at ambient temperature, the composite element is separated from the solution and the respective contents of the $Ag^+$ element and $Ni^{2+}$ are determined.

It is found that the element contains 7.41% by weight $Ag^+$ and only 1.60% by weight of $Ni^{2+}$. Therefore this element has a clear selectivity for the silver ion compared with the nickel ion.

EXAMPLE 10

This example uses the composite material obtained in example 1 and it is contacted with an aqueous solution containing $10^{-1}$ mole/l of a cation such as $Ag^+$, $K^+$, $Li^+$, $Rb^+$, $Ni^{2+}$, $Cs^+$ or $Hg^{2+}$, in the form of a salt and for 48 h. After said contacting, the cation quantity retained by the composite element is determined.

The results obtained are given in the attached table 1. The latter also indicates in each case the solvent and counterion used. Under these conditions, there is a quasi-saturation in the case of Ag, K, Hg and Cs, but a very low affinity for lithium.

EXAMPLE 11

This example follows the same operating procedure as in example 10, but the solution contacted with the composite element is an aqueous solution containing several metal cations in the form of acetates and at concentrations of 0.1 mole/l for each cation. After 48 h contacting, a determination also takes place of the cation quantities absorbed by the composite element, the results obtained being given in the attached table 2. On the basis of the latter, it is clear that the chromium is better retained by the composite element than the other cations.

EXAMPLE 12

This example follows the same operating procedure as in example 11, but with a solution containing other cations in the form of acetates at a concentration of 0.1 mole/l for each cation.

The results obtained are also given in table 2. On the basis of these results, it is clear that K and Ba are much better absorbed.

TABLE 1

| Cation (conc. 0.1 mole/l$^{-1}$) | Counterion | Solvent | Number of ions extracted/100 g of polymer |
|---|---|---|---|
| $Ag^+$ | $BF_4-$ | water | $7.1.10^{22}$ |
| $K^+$ | " | " | $6.5.10^{22}$ |
| $Li^+$ | " | " | $1.1.10^{22}$ |
| $Rb^+$ | $NO_3-$ | acetonitrile | $5.1.10^{22}$ |
| $Ni^{++}$ | acetylacetonate | " | $4.7.10^{22}$ |
| $Cs^+$ | acetate | " | $7.0.10^{22}$ |
| $Hg^{++}$ | " | water | $5.8.10^{22}$ |

TABLE 2

| | Cation in mixture (each 0.1 mole/l) | | Number of ions extracted/100 g of polymer |
|---|---|---|---|
| EX 11 | $Cr^{+++}$ | | $20.2.10^{21}$ |
| | $Zn^{++}$ | | $2.3.10^{21}$ |
| | $Ni^{++}$ | Heavy ions | $2.9.10^{21}$ |
| | $Co^{++}$ | | $1.7.10^{21}$ |
| | $K^+$ | | $8.2.10^{21}$ |
| EX 12 | $Ba^{++}$ | Alkali metal | $7.8.10^{21}$ |
| | $Ca^{++}$ | and alkaline | $3.0.10^{21}$ |
| | $Cs^+$ | earth ions | $2.2.10^{21}$ |
| | $Sr^{++}$ | | $1.9.10^{21}$ |

We claim:

1. A composite element, comprising a support of an electrically-conducting, polyaromatic structure product covered with a polymer or copolymer of a crown dibenzoether of the formula:

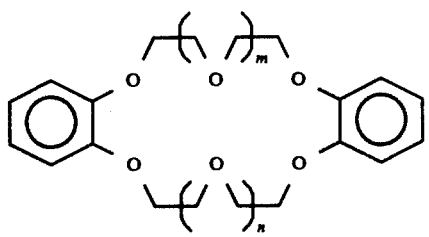
(I)

in which m and n, which are the same or different, each have a value of 0 and 1 to 10, provided that m+n is ≦10.

2. The composite element of claim 1, wherein m and n are each 0.

3. The composite element of claim 1, wherein m and n are each 1.

4. The composite element of claim 1, wherein m is 0.

5. The composite element of claim 1, wherein n is 1.

6. The composite element of claim 1, wherein m and n are each 2.

7. A composite element, comprising a support made from metal or an electrically-conducting, polyaromatic structure product covered with a polymer or copolymer of a dibenzoether of the formula:

(II)

in which p is equal to 0 or an integer from 1 to 6 and $R^1$ and $R^2$, which are the same or different, are alkyl, aryl or heterocyclic radicals.

8. The composite element of claim 7, wherein $R^1$ and $R^2$ are methyl and p is 0 or 2.

9. The composite element of claim 7, wherein the copolymer is a copolymer of dibenzoether of formula (II) and crown dibenzoether of the formula:

(I)

in which m and n, which are the same or different, each have a value of 0 and 1 to 10, provided that $m+n \leq 10$.

10. The composite element of claim 7, wherein the support is a metal or is coated with a non-oxidizable metal at a potential of $+1V$ compared with a 0.1M Ag/Ag+ electrode.

11. The composite element of claim 7, wherein said aryl radicals are phenyl radicals.

12. The composite element of claim 7, wherein said heterocyclic radicals are selected from the group consisting of 2-thiophene, 3-thiophene, 2-pyrrole and 3-pyrrole.

13. The composite element according to claim 1, wherein the support is constituted by a graphite felt, fibers or fabric.

14. The composite element according to claim 1, wherein the support is a discontinuous fiber support formed from graphite particles.

15. The composite element according to claim 1, wherein the support has a specific surface of 0.01 to 20 $m^2/g$.

* * * * *

UNITED STATES PATENT AND TRADEMARK OFFICE
CERTIFICATE OF CORRECTION

PATENT NO. : 5,200,041

DATED : April 6, 1993

INVENTOR(S) : Veronique Le Berre et al.

It is certified that error appears in the above-identified patent and that said Letters Patent is hereby corrected as shown below:

On the title page, Item [19] and [75],

The inventors' information is incorrect, should read:

--[19] Le Berre et al.--

--[75] Veronique Le Berre, Rennes; Lysiane Angely, Cesson-Sevigne; Noelle Simonet-Guegen, Betton; Jacques Simonet, Betton; Henri Bouas-Laurent, Talence; Viviane Questaigne, Rennes; Jean-Pierre Desvergne, Leognan, all of France--

UNITED STATES PATENT AND TRADEMARK OFFICE
CERTIFICATE OF CORRECTION

PATENT NO. : 5,200,041
DATED : April 6, 1993
INVENTOR(S) : Veronique Le Berre, et al It is certified that error appears in the above-indentified patent and that said Letters Patent is hereby corrected as shown below:

Column 6, lines 5-8, in the top formula:

change the three anions designated " .Z "

to -- X⁻ -- (each occurrence),

Signed and Sealed this

First Day of March, 1994

Attest:

BRUCE LEHMAN

Attesting Officer     Commissioner of Patents and Trademarks